(12) United States Patent
Lee et al.

(10) Patent No.: US 11,477,399 B2
(45) Date of Patent: Oct. 18, 2022

(54) TEMPERATURE MEASURING DEVICE AND METHOD USING THERMAL IMAGING CAMERA, AND COMPUTER-READABLE RECORDING MEDIUM

(71) Applicant: U ELECTRONICS CO., LTD., Suwon-si (KR)

(72) Inventors: Joon Sub Lee, Seoul (KR); Tae Hwan Eom, Suwon-si (KR); Min Kyu Lee, Suwon-si (KR); Hyung Won Kim, Hwaseong-si (KR); Mi Sook Ahn, Hwaseong-si (KR)

(73) Assignee: U ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/972,904

(22) PCT Filed: Feb. 11, 2020

(86) PCT No.: PCT/KR2020/001904
§ 371 (c)(1),
(2) Date: Dec. 7, 2020

(87) PCT Pub. No.: WO2020/166939
PCT Pub. Date: Aug. 20, 2020

(65) Prior Publication Data
US 2021/0250524 A1    Aug. 12, 2021

(30) Foreign Application Priority Data

Feb. 12, 2019    (KR) ........................ 10-2019-0016107

(51) Int. Cl.
*H04N 5/33*    (2006.01)
*G01J 5/48*    (2022.01)
*G01J 5/00*    (2022.01)

(52) U.S. Cl.
CPC .................. *H04N 5/33* (2013.01); *G01J 5/48* (2013.01); *G01J 2005/0077* (2013.01)

(58) Field of Classification Search
None
See application file for complete search history.

(56) References Cited

U.S. PATENT DOCUMENTS 5,994,701 A * 11/1999 Tsuchimoto .............. G01J 5/08
250/252.1
6,717,228 B2    4/2004 Ando et al.
(Continued)

FOREIGN PATENT DOCUMENTS

CA        2304725 A1 *  4/1999 ........... H04N 5/3656
CN     101919237 A  * 12/2010 ........... H04N 5/3651
(Continued)

*Primary Examiner* — Stefan Gadomski
(74) *Attorney, Agent, or Firm* — The Webb Law Firm

(57) ABSTRACT

A temperature measuring device using a thermal imaging camera according to an embodiment of the present invention may comprise: a first operation module for obtaining, for the thermal imaging camera, a curve of temperature difference versus output code difference where the X axis represents the output code difference and the Y axis represents the temperature difference indicated by a plurality of measured values; a second operation module for obtaining a function of temperature difference versus output code difference, the function curve-fitted by using the curve of temperature difference versus output code difference; and a third operation module for measuring the temperature of an object by applying the curve-fitted function of temperature difference versus output code difference.

9 Claims, 11 Drawing Sheets

(56) References Cited

U.S. PATENT DOCUMENTS

| | | | |
|---|---|---|---|
| 7,683,321 B1* | 3/2010 | King | H04N 5/33 250/332 |
| 2006/0153277 A1* | 7/2006 | Yoshida | G01K 3/005 374/178 |
| 2006/0289862 A1* | 12/2006 | Yoshida | G06F 1/206 257/48 |
| 2010/0237245 A1 | 9/2010 | King et al. | |
| 2017/0089764 A1* | 3/2017 | Lee | G01J 5/22 |

FOREIGN PATENT DOCUMENTS

| | | | |
|---|---|---|---|
| JP | 02236426 A | 9/1990 | |
| JP | H05302855 A | 11/1993 | |
| JP | H06186085 A | 7/1994 | |
| JP | H09292283 A | 11/1997 | |
| JP | 2001296184 A | 10/2001 | |
| JP | 2001304973 A | 10/2001 | |
| JP | 2003247889 A | 9/2003 | |
| JP | 2016133305 A | 7/2016 | |
| JP | 2017126812 A | 7/2017 | |
| KR | 20030049729 A | 6/2003 | |
| KR | 101666095 B1 | 10/2016 | |
| KR | 101690096 B1 | 12/2016 | |
| KR | 102064582 B1 | 1/2020 | |
| WO | WO-2005015143 A2 * | 2/2005 | G01J 5/0834 |

* cited by examiner

TEMPERATURE MEASURING DEVICE AND METHOD USING THERMAL IMAGING CAMERA, AND COMPUTER-READABLE RECORDING MEDIUM

CROSS-REFERENCE TO RELATED APPLICATIONS

This application is the United States national phase of International Application No. PCT/KR2020/001904 filed Feb. 11, 2020, and claims priority to Korean Patent Application No. 10-2019-0016107 filed Feb. 12, 2019, the disclosures of which are hereby incorporated by reference in their entirety.

TECHNICAL FIELD

The present disclosure relates to a temperature measuring device and a method using a thermal imaging camera, and a computer-readable recording medium.

BACKGROUND ART

A thermal imaging camera is the most widely known device that thermally images a surface of an object and measures temperature distribution due to advantages thereof such as high spatial resolution, temperature resolution, a non-contact method, and the like.

In order to measure a temperature of an object using such a thermal imaging camera, a process of first obtaining a curve of temperature difference versus output code difference, and approximating the curve of temperature difference versus output code difference with a fitting function of a $2^{nd}$ polynomial or a fitting function of a $3^{rd}$ polynomial is required.

Here, the output code is a value obtained by binarizing a voltage or a current output from a thermal sensor provided in the thermal imaging camera into 8 bits, 16 bits, or the like.

In the process of approximating the curve of output code difference versus temperature difference with the fitting function of a $2^{nd}$ polynomial or the fitting function of a $3^{rd}$ polynomial, a temperature error may necessarily occur.

That is, as shown in FIG. 1, when a curve of temperature difference versus output code difference 100 is fitted with a $2^{nd}$ polynomial fitting function 110, a temperature error E1 may occur, and when the curve of temperature difference versus output code difference 100 is fitted with a $3^{rd}$ polynomial fitting function 120, a temperature error E2 may occur. These temperature errors E1 and E2 tend to increase, toward a high-temperature region and as a temperature measurement region widens.

As described above, due to the temperature errors E1 and E2 between the curve of temperature difference versus output code difference 100 and the fitting functions 110 and 120, there is a problem in which an error may also occur between an actual temperature of an object and a temperature measured using the thermal imaging camera.

PRIOR ART

Patent Document (Patent Document 1) Korean Patent Registration No. 1666095 ('Temperature Correction Type Thermal Imaging Camera System for Monitoring Fossil Fuel Boiler Attachments', Registration Date: Oct. 7, 2016)

SUMMARY OF THE INVENTION

Technical Problem

An embodiment of the present disclosure is to provide a temperature measuring device and a method using a thermal imaging camera capable of reducing an error occurring between an actual temperature of an object and a temperature measured using a thermal imaging camera, and a computer-readable recording medium.

Technical Solution

According to a first embodiment of the present disclosure, a temperature measuring device using a thermal imaging camera includes: a first operation module for obtaining, for the thermal imaging camera, a curve of temperature difference versus output code difference, where an X axis represents output code difference and a Y axis represents temperature difference indicated by a plurality of measured values; a second operation module for obtaining a function of temperature difference versus output code difference, the function curve-fitted by using the curve of temperature difference versus output code difference; and a third operation module for measuring a temperature of an object by applying the curve-fitted function of temperature difference versus output code difference.

According to a second embodiment of the present disclosure, a temperature measuring method using a thermal imaging camera includes: a first step for obtaining, for the thermal imaging camera, a curve of temperature difference versus output code difference, where an X axis represents output code difference and a Y axis represents temperature difference indicated by a plurality of measured values; a second step for obtaining a function of temperature difference versus output code difference, the function curve-fitted by using the curve of temperature difference versus output code difference; and a third step for measuring a temperature of an object by applying the curve-fitted function of temperature difference versus output code difference.

According to a third embodiment of the present disclosure, a computer-readable recording medium, recording a program for executing the temperature measuring method on a computer, is provided.

Advantageous Effects

According to an embodiment of the present disclosure, by directly obtaining a function of temperature difference versus output code difference, the function curve-fitted from a curve of temperature difference versus output code difference indicated by a plurality of measured values, or obtaining the curve-fitted function of temperature difference versus output code difference using an inverse function of the curve of temperature difference versus output code difference, there is an advantage of reducing an error occurring between the actual temperature of the object and the temperature measured using the thermal imaging camera.

DETAILED DESCRIPTION

Figure 1:
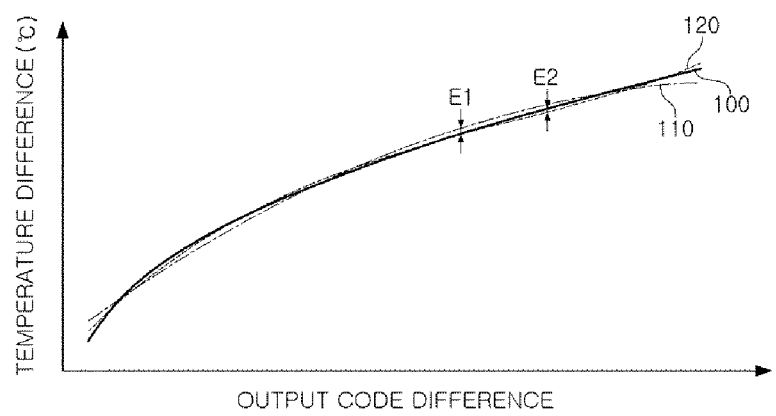
FIG. 1 is a view illustrating a curve of temperature difference versus output code difference of a conventional thermal imaging camera and a fitting function therefor.

Hereinafter, embodiments in the present disclosure will be described hereinafter with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. In the drawings, the same reference numerals will be used throughout to designate the same or like elements, and the shapes and dimensions of elements may be exaggerated for clarity.

Figure 2:
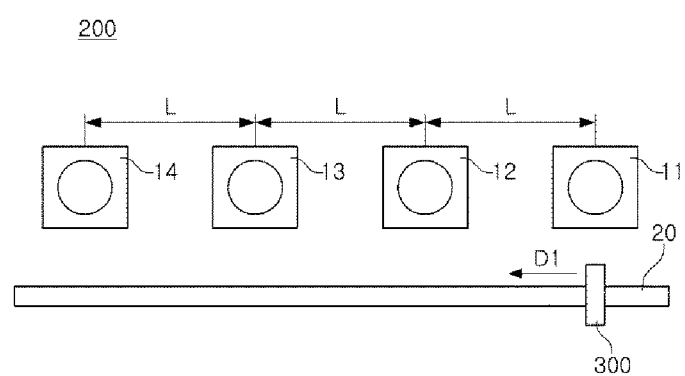
FIG. 2 is a view illustrating a concept for obtaining a curve of temperature difference versus output code difference for a thermal imaging system using a temperature measuring device according to an embodiment of the present disclosure.

FIG. 2 is a view illustrating a concept for obtaining a curve of temperature difference versus output code difference for a thermal imaging camera using a temperature measuring device according to an embodiment of the present disclosure. The curve of temperature difference versus output code difference described above may be a curve indicated by a plurality of measured values.

As shown in FIG. 2, in order to obtain a curve of temperature difference versus output code difference, for a thermal imaging camera, a thermal imaging camera 300 may move in a direction D1 on a guide rail 20, and a plurality of heating elements 11 to 14 having different known temperatures may be disposed in front of the thermal imaging camera 300 at a predetermined interval L.

For example, the first heating element 11 may be heated at a temperature of 100 degrees, the second heating element 12 may be heated at a temperature of 120 degrees, the third heating element 13 may be heated at a temperature of 140 degrees, and the fourth heating element 14 may be heated at a temperature of 160 degrees. It should be noted that the above-described specific value of the temperature or the number of heating elements is to aid understanding of the invention and the present invention is not limited to these specific values.

That is, different temperatures may be generated by using one heating element, and in this case, the guide rail 20 may be unnecessary. However, when a plurality of heating elements 11 to 14 are used, there is an advantage in that it is possible to shorten the time to obtain a curve of temperature difference versus output code difference (to be described later).

Figure 3:
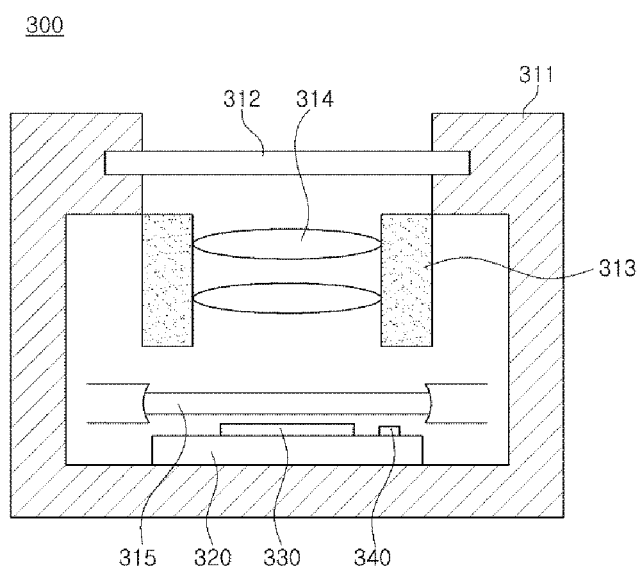
FIG. 3 is a view illustrating a thermal imaging camera according to an embodiment of the present disclosure.

Meanwhile, FIG. 3 is a view illustrating a thermal imaging camera according to an embodiment of the present disclosure.

As shown in FIG. 3, a thermal imaging camera 300 may include a housing 311, an IR window 312 provided on a through-surface of an upper portion of the housing 311, a barrel 313, a plurality of lenses 314 provided inside the barrel 313, a board 320, a thermal sensor 330 and a temperature sensor 340 provided on the board 320, and a shutter 315 for blocking or passing infrared rays. The thermal sensor 330 described above may be, for example, an infrared sensor, but is not limited thereto.

In particular, one temperature sensor 340 for measuring a temperature of the board 320 may be provided on the board 320, and the temperature of the board 320 measured by the temperature sensor 340 described above, may be assumed as a temperature of the shutter 315.

In addition, although only one temperature sensor attached to the board 320 is shown in FIG. 3, according to embodiments, two or more temperature sensors may be attached to the board 320. In this case, an average value of the two or more temperature sensors attached to the board 320 may also be used. In addition, in the above-described embodiment, only the board temperature is described, but at least one temperature of the board, shutter, barrel, and housing may be included.

Figure 4:
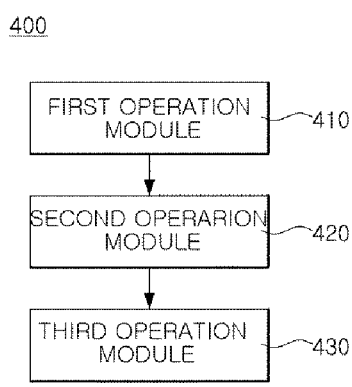
FIG. 4 is a block diagram of a temperature measuring device according to an embodiment of the present disclosure.
Figure 5A:
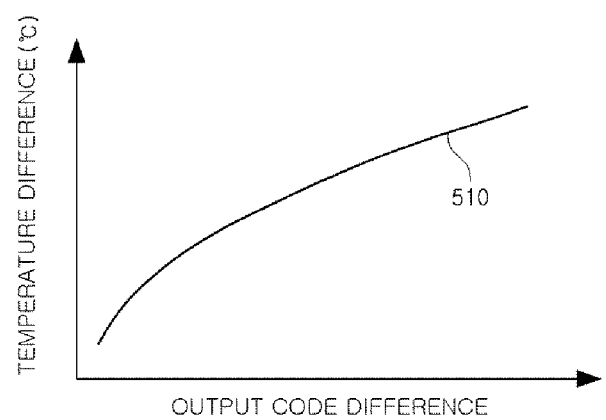
FIG. 5A is a view illustrating a curve of temperature difference versus output code difference of the thermal imaging camera.
Figure 5B:
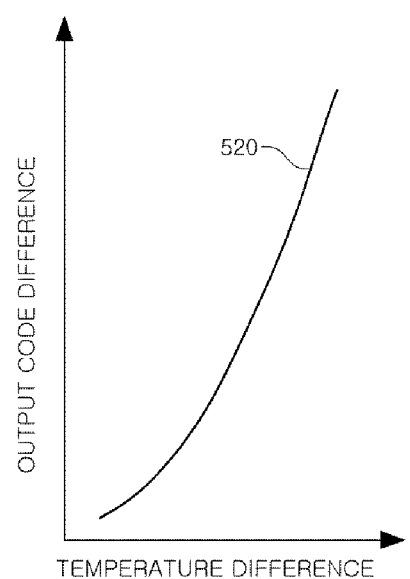
FIG. 5B is a view illustrating an inverse function of a curve of temperature difference versus output code difference of the thermal imaging camera.
Figure 5C:
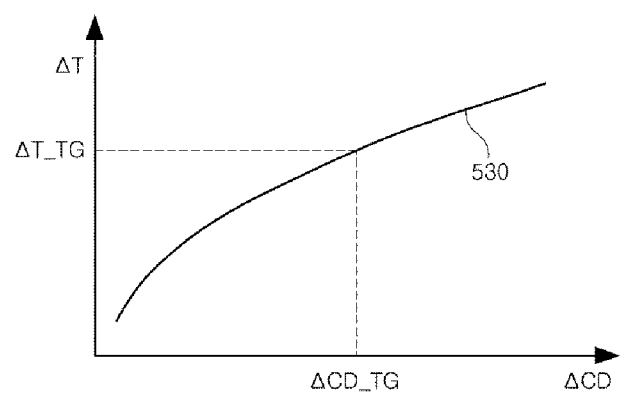
FIG. 5C is a view illustrating a process of measuring a temperature of an object by applying a function of temperature difference versus interpolated output code difference according to an embodiment of the present disclosure.

Meanwhile, FIG. 4 is a block diagram of a temperature measuring device according to an embodiment of the present disclosure, FIG. 5A is a view illustrating a curve of temperature difference versus output code difference, FIG. 5B is a view illustrating an inverse function of a curve of temperature difference versus output code difference of the thermal imaging camera, and FIG. 5C is a view illustrating a process of measuring a temperature of an object by applying the curve-fitted function of temperature difference versus output code difference according to an embodiment of the present disclosure.

First, as shown in FIG. 4, the temperature measuring apparatus 400 according to an embodiment of the present disclosure may include a first operation module 410, a second operation module 420, and a third operation module 430.

Specifically, the first operation module 410 of the temperature measuring device 400 may obtain, for a thermal imaging camera, a curve of temperature versus output code difference indicated by a plurality of measured values where an X axis represents an output code difference and a Y axis represents a temperature difference. The obtained curve of temperature difference versus output code difference may be transmitted to a second operation module 420.

Hereinafter, with reference to FIGS. 2 to 5A, a process of obtaining a curve of temperature difference versus output code difference, where an X axis represents an output code difference and a Y axis represents a temperature difference will be described in detail. In describing the present disclosure, the output code means a value by binarizing a voltage or a current output from the thermal sensor 330 provided in the thermal imaging camera 300 into 8 bits, 16 bits, or the like.

As shown in FIGS. 2 to 5A, the first operation module 410 of the temperature measuring device 400 provided in the thermal imaging camera 300 may obtain, for a plurality of heating elements 11 to 14 having different known temperatures, based on a temperature Tref of a board 320 before opening a shutter 315 and an output code from a thermal sensor 330 and a temperature of the heating elements 11 to 14 after opening the shutter 315 and an output code from the thermal sensor 330, a curve of temperature difference versus output code difference (510 in FIG. 5A). Here, the temperature of the board 320 may be measured using a temperature sensor 340 attached to one surface of the board 320 as shown in FIG. 3.

Specifically, after positioning the thermal imaging camera 300 in front of the first heating element 11, and before opening the shutter 315, the temperature Tref of the board 320 and the output code (CD(Tref)) from the thermal sensor 330 are obtained, and after opening the shutter 315, the temperature T1 of the first heating element 11 and the output code (CD(T1)) from the thermal sensor 330 are obtained. Thereafter, for the first heating element 11, an output code difference ΔCD1 (=CD (T1)−CD (Tref)) and a temperature difference ΔT1 (=T1−Tref), before and after opening the shutter 315 are obtained.

Thereafter, after the thermal imaging camera 300 is sequentially moved from the second heating element 12 to the fourth heating element 14 in the same manner as above, and then an output code difference and a temperature difference, for each of the heating elements 12 to 14, before and after opening the shutter 315 may be obtained. Accordingly, the output code difference and the temperature difference, for each of the second to fourth heating element 12 to 14 may be obtained.

For example, in the case of the second heating element 12, output code difference before and after opening the shutter 315 may be ΔCD2(=CD(T2)−CD(Tref)), and temperature difference may be ΔT2(=T2−Tref), in the case of the third heating element 13, an output code difference before and after opening the shutter 315 may be ΔCD3(=CD(T3)−CD (Tref)), and temperature difference may be ΔT3(=T3−Tref), and in the case of the fourth heating element 14, output code difference before and after opening the shutter 315 may be ΔCD4(=CD(T4)−CD(Tref)), and temperature difference may be ΔT4(=T4−Tref).

The curve of temperature difference versus output code difference 510, obtained by the above-described method is show in FIG. 5A, where an X axis may be output code difference, a Y axis may be temperature difference, and may be obtained using a plurality of pieces of data.

Meanwhile, in the above-described embodiment, it is described that the curve of temperature difference versus output code difference is obtained based only on the temperature of the board, but it is as described above that at least one temperature of the board, the shutter, the barrel, and the housing can be used.

Next, the second operation module 420 of the temperature measuring device 400 may obtain a curve-fitted function of temperature difference versus output code difference (530 in FIG. 5C) by using the curve of temperature difference versus output code difference.

According to a first embodiment of the present disclosure, the second operation module 420 may directly obtain coefficients A, B, and C of the curve-fitted function of temperature difference versus output code difference (530 in FIG. 5C), defined by the following equation 1, from the curve of temperature difference versus output code difference (510 in FIG. 5A) itself.

$$\Delta Tg = \sqrt[n]{A(\Delta CD + B)} + C \qquad \text{[Equation 1]}$$

Here, ΔTg may be a temperature difference, n may be a natural number, greater than or equal to 2, ΔCD may be an output code difference, and A, B, and C may be coefficients of a curve-fitted function of temperature difference function versus output code difference.

Meanwhile, according to a second embodiment of the present disclosure, the second operation module 420 may obtain a curve-fitted function of temperature difference versus output code difference (530 in FIG. 5C), using an inverse function of the curve of temperature difference versus output code difference (510 in FIG. 5A).

Specifically, the second operation module 420 may obtain, for the inverse function of the curve of temperature difference versus output code difference (510 in FIG. 5A) may obtain a fitting function (520 in FIG. 5B), where an X axis represents a temperature difference and a Y axis represents an output code difference, and may obtain a coefficient the curve-fitted function of temperature difference versus output code difference (530 in FIG. 5C) where an X axis represents a temperature difference, and a Y axis represents an output code difference.

More specifically, the second operation module 420 may obtain, for the inverse function of the curve of temperature difference versus output code difference obtained from the first operation module 410 according to the following equation 2, a fitting function (520 in FIG. 5B) represented by a quadratic equation, where an X axis represents the temperature difference, and a Y axis represents the output code difference.

$$\Delta CD = a + b \times \Delta Tg + c \times \Delta Tg^2 \qquad \text{[Equation 2]}$$

Here, ΔCD may be an output code difference, ΔTg may be a temperature difference, and a, b, and c may be coefficients of a fitting function.

That is, since the shape of the curve of temperature difference versus output code difference (510 in FIG. 5A) is different from the shape of the quadratic curve, which is a fitting function, an error occurs between the curve of output code difference versus temperature difference (510 in FIG. 5A) and the fitting function. However, according to an embodiment of the present disclosure, the error can be reduced by obtaining a fitting function (520 in FIG. 5B) for an inverse function, similar to the shape of a quadratic curve.

In Equation 2 described above, a quadratic equation is mainly described, but it will be apparent to those skilled in the art that this can be applied to a quadratic equation or more so as to aid in an understanding of the invention.

Next, the second operation module 420 may obtain a curve-fitted function of temperature difference versus output code difference (530 in FIG. 5C) where an X axis represents an output code difference and a Y axis represents a temperature difference, using the fitting function (520 in FIG. 5B) obtained above according to the following equation 2. The curve-fitted function of temperature difference versus output code difference (530 in FIG. 5C) may be transmitted to a third operation module 430.

$$\Delta Tg = \sqrt[n]{A(\Delta CD + B)} + C \qquad \text{[Equation 3]}$$

Here, ΔTg is a temperature difference, n is a natural number, greater than or equal to 2, ΔCD is an output code difference, and A, B, and C are coefficients of a curve-fitted function of temperature difference versus output code difference, and when n is 2, A=1/c, B=(b²−4×a×c)/4c, C=−b/(2c), and a, b, and c may be coefficients of the fitting function described in Equation 2.

That is, according to the second embodiment of the present disclosure, the second operation module 420 may obtain coefficients A, B, and C of the curve-fitted function of temperature difference versus output code difference (530 in FIG. 5C) using the coefficients a, b, and c of the fitting function.

Finally, the third calculation module 430 of the temperature measuring device 400 may measure a temperature of an object by applying the curve-fitted function of temperature difference versus output code difference 530 in FIG. 5C.

Hereinafter, a process of measuring the temperature of the object will be described in detail with reference to FIGS. 3, 4, and 5C.

Specifically, the fourth operation module 440 may obtain, for an object (not shown) to measure a temperature, an output code difference (ΔCD_TG) between an output code from the thermal sensor 330 before opening the shutter 315 and an output code from the thermal sensor 330 after opening the shutter 315.

Thereafter, the obtained output code difference ΔCD_TG may be applied (substituting) to the curve-fitted function of temperature difference versus output code difference 530 as shown in FIG. 5C to obtain temperature difference ΔT_TG.

Thereafter, as shown in the following equation 4, the temperature of the object can be obtained by adding the temperature of the board Tref, when the curve of temperature difference versus output code difference is obtained, to the obtained temperature difference ΔT_TG.

$$T = \Delta T\_TG + Tref \qquad \text{[Equation 4]}$$

Here, T may be a temperature of an object, ΔT_TG may be a temperature difference obtained above, and Tref may be a board temperature when obtaining a curve of temperature difference versus output code difference.

Figure 6A:
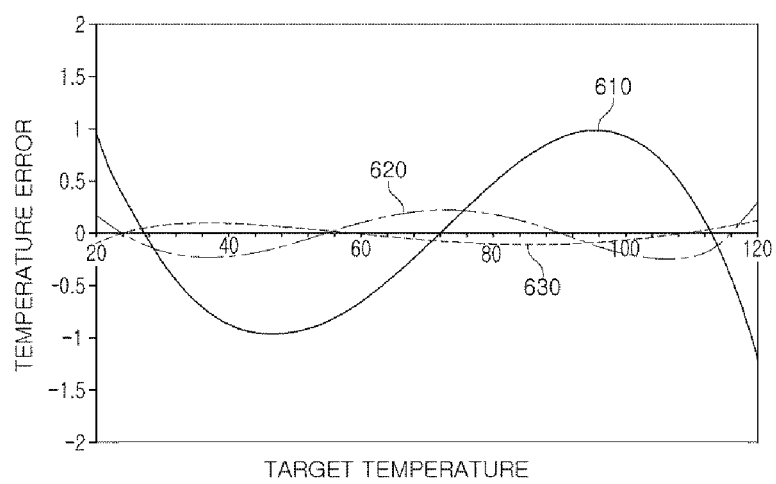
FIGS. 6A to 6C illustrate comparing a temperature error between a case of using a function of temperature difference versus output code difference interpolated according to an embodiment of the present disclosure and a case using a fitting function of a conventional $2^{nd}$ polynomial and a fitting function of a $3^{rd}$ polynomial.
Figure 6B:
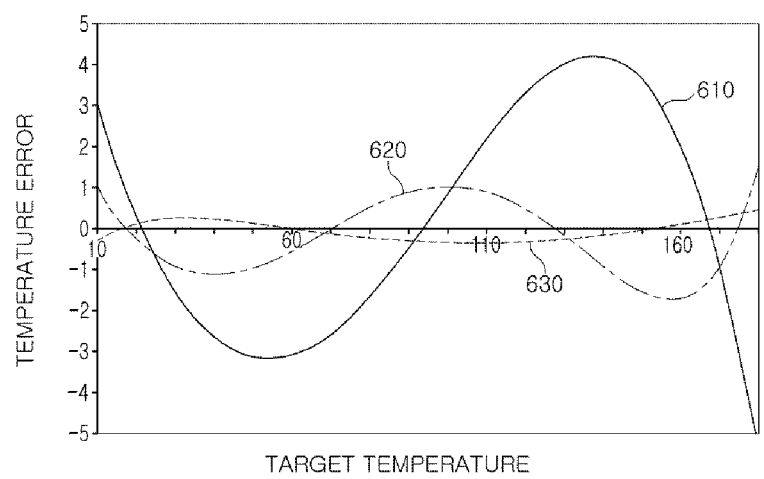
Figure 6C:
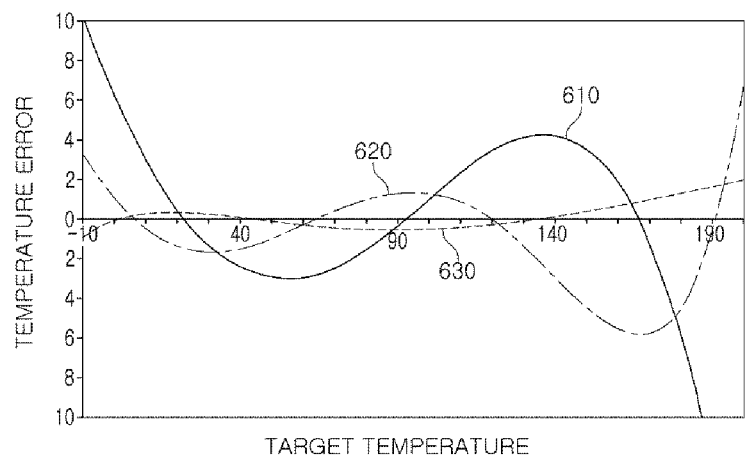

FIGS. 6A to 6C illustrate comparing a temperature error between a case of using the curve-fitted function of temperature difference versus output code difference according to an embodiment of the present disclosure, for an object having a temperature of various ranges, and between a case of using a fitting function of a conventional $2^{nd}$ polynomial, and a $3^{rd}$ polynomial.

In particular, FIG. 6A illustrates that when a temperature (a target temperature) range of an object changes from 20 degrees to 120 degrees, FIG. 6B illustrates that when a temperature (a target temperature) range of an object changes from 10 degrees to 180 degrees, and FIG. 6C illustrates that when a temperature (a target temperature) range of an object changes from −10 degrees to 200 degrees. A reference numeral 610 denotes a temperature error when a fitting function of a $2^{nd}$ polynomial is used, a reference numeral 620 denotes a temperature error when a fitting function of a $3^{rd}$ polynomial is applied, and a reference numeral 630 denotes a temperature error when a curve-fitted function of temperature difference versus output code difference is used according to an embodiment of the present disclosure.

As shown in FIGS. 6A to 6C, it can be seen that the temperature error 630 between the temperature of the object measured using the curve-fitted function of temperature versus output code difference according to an embodiment of the present disclosure and the actual temperature of the object is significantly reduced, than the other cases 610 and 620, and in particular, it can be seen that the temperature error is much smaller as the temperature increases in the high temperature region and the temperature measurement region is wider.

As described above, according to an embodiment of the present disclosure, by directly obtaining a curve-fitted function of temperature difference versus output code difference from the curve of temperature difference versus output code difference indicated by a plurality of measured values, or by obtaining the curve-fitted function of temperature difference versus output code difference using an inverse function of the curve of temperature difference versus output code difference, there is an advantage capable of reducing an error occurring between the actual temperature of the object and the temperature measured using the thermal imaging camera.

Figure 7:
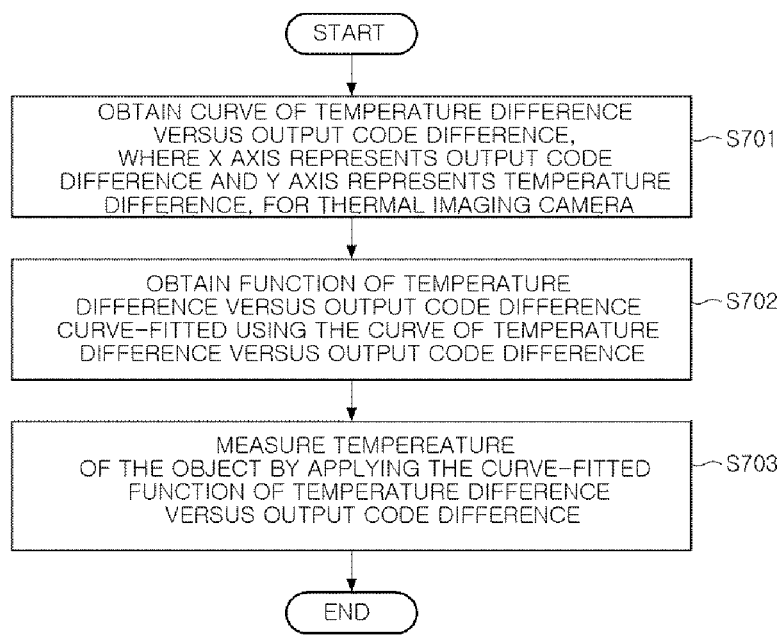
FIG. 7 is a flowchart illustrating a temperature measurement method using a thermal imaging camera according to an embodiment of the present disclosure.

Meanwhile, FIG. 7 is a flowchart illustrating a temperature measurement method using a thermal imaging camera according to an embodiment of the present disclosure.

Hereinafter, a temperature measurement method using a thermal imaging camera according to an embodiment of the present disclosure will be described with reference to FIGS. 2 to 7. However, for the sake of simplicity of invention, descriptions overlapped with those described in FIGS. 2 to 6C will be omitted.

As shown in FIGS. 2 to 7, first, the first operation module 410 may obtain, for a thermal imaging camera, a curve of temperature difference versus output code difference (510 in FIG. 5A) indicated by a plurality of measured values where an X axis represents an output code difference and a Y axis represents a temperature difference (S701). The obtained curve of temperature difference versus output code difference may be transmitted to a second calculation module 420.

Next, the second operation module 420 may obtain a function of temperature difference versus output code difference (530 in FIG. 5C), curve-fitted using the curve of temperature difference versus output code difference (510 in 5A) (S702). The curve-fitted function of temperature difference versus output code difference (530 in FIG. 5C) may be transmitted to a third operation module 430.

According to a first embodiment of the present disclosure, the second operation module 420 may directly obtain coefficients A, B, and C of the curve-fitted function of temperature difference versus output code difference (530 in FIG. 5C), defined by Equation 1 from the curve of temperature difference versus output code difference (510 in FIG. 5A) itself through curve fitting.

According to a second embodiment of the present disclosure, the second operation module 420 may obtain, for the inverse function of the curve of temperature difference versus output code difference (510 in FIG. 5A), a fitting function (520 in FIG. 5B), where an X axis represents a temperature difference and a Y axis represents an output code difference, and a function of the curve-fitted function of temperature difference versus output code difference (530 in FIG. 5C), where an X axis represents an output code difference and a Y axis represents a temperature difference using the coefficient of the fitting function may be obtained, which is the same as described above.

Finally, the third operation module 430 may measure a temperature of an object by applying the curve-fitted function of temperature difference versus output code difference (530 of FIG. 5C) (S704).

As described above, according to an embodiment of the present disclosure, by directly obtaining a curve-fitted function of temperature difference versus output code difference from a curve of temperature difference versus output code difference, indicated by a plurality of measured values, or obtaining the curve-fitted function of temperature difference versus output code difference using an inverse function of the curve of temperature difference versus output code difference, there is an advantage of capable of reducing an error occurring between an actual temperature of an object and a temperature measured using a thermal imaging camera.

The temperature measuring method using a thermal imaging camera according to an embodiment of the present disclosure described above may be manufactured as a program to be executed in a computer and stored in a computer-readable recording medium. As examples of computer-readable recording media, ROM, RAM, CD-ROM, a magnetic tape, a floppy disk, an optical data storage device, and the like may be included.

In addition, the computer-readable recording medium may be distributed over a computer system connected through a network, so that computer-readable codes may be stored and executed in a distributed manner. Functional programs, codes, and code segments for implementing the method may be easily inferred by programmers in the art to which the present disclosure belongs.

In addition, in describing the present disclosure, '~ module' may be implemented by various methods, for example, a processor, program commands performed by the processor, a software module, a microcode, a computer program product, a logic circuit, an application-specific integrated circuit, a firmware, and the like.

While exemplary embodiments have been shown and described above, it will be apparent to those skilled in the art that modifications and variations could be made without departing from the scope of the present invention, as defined by the appended claims.

The invention claimed is:

1. A temperature measuring device using a thermal imaging camera, comprising:
   a first operation module for obtaining, for the thermal imaging camera, a curve of temperature difference versus output code difference, where an X axis represents output code difference and a Y axis represents temperature difference indicated by a plurality of measured values;
   a second operation module for obtaining a function of temperature difference versus output code difference, the function curve-fitted by using the curve of temperature difference versus output code difference; and
   a third operation module for measuring a temperature of an object by applying the curve-fitted function of temperature difference versus output code difference.

2. The temperature measuring device using a thermal imaging system of claim 1, wherein the curve-fitted function of temperature difference versus output code difference is a function expressed by the following equation, $$\Delta Tg = \sqrt[n]{A(\Delta CD + B)} + C$$

where $\Delta Tg$ is a temperature difference, n is a natural number, greater than or equal to 2, $\Delta CD$ is an output code difference, and A, B, and C are coefficients of the curve-fitted function of temperature difference versus output code difference,
wherein the second operation module directly obtains the coefficients of the function of temperature difference versus output code difference, the function curve-fitted by the curve of temperature difference versus output code difference.

3. The temperature measuring device using a thermal imaging system of claim 1, wherein the second operation module obtains, for an inverse function of the curve of temperature difference versus output code difference, a fitting function, where an X axis represents temperature difference and a Y axis represents output code difference, and obtains a coefficient of the curve-fitted function of temperature difference versus output code difference, where an X axis represents output code difference, and a Y axis represents temperature difference by using the coefficient of the obtained fitting function.

4. The temperature measuring device using a thermal imaging camera of claim 3, wherein the curve-fitted function of temperature difference versus output code difference is a function expressed by the following equation, $$\Delta Tg = \sqrt[n]{A(\Delta CD + B)} + C$$

where $\Delta Tg$ is a temperature difference, n is a natural number, greater than or equal to 2, $\Delta CD$ is an output code difference, and A, B, and C are coefficients of the curve-fitted function of temperature difference versus output code difference, and when n is 2, $A=1/c$, $B=(b^2-4\times a\times c)/4c$, $C=-b/(2c)$, and a, b, and c are coefficients of the fitting function.

5. The temperature measuring device using a thermal imaging camera of claim 3, wherein the fitting function is a quadratic equation expressed by the following equation, $$\Delta CD = a + b \times \Delta Tg + c \times \Delta Tg^2$$

where, $\Delta CD$ is an output code difference, $\Delta Tg$ is a temperature difference, and a, b, and c are coefficients of the fitting function.

6. The temperature measuring device using a thermal imaging camera of claim 1, wherein the first operation module obtains, for heating elements having different known temperatures, based on a temperature of a board of the thermal imaging camera provided in the thermal imaging camera and an output code from a thermal sensor of the thermal imaging camera before opening a shutter and a temperature of a heating element and an output code from the thermal sensor after opening the shutter, a curve of temperature difference versus output code difference.

7. The temperature measuring device using a thermal imaging camera of claim 5, wherein the third operation module, for an object, obtains output code difference between the output code from a thermal sensor before opening a shutter and the output code from the thermal sensor after opening the shutter, obtains temperature difference by applying the obtained output code difference to the curve-fitted function of temperature difference versus output code difference, and then obtains a temperature of the object by adding a temperature of a board when the curve of temperature difference versus output code difference is obtained to the obtained temperature difference.

8. A temperature measuring method using a thermal imaging camera, comprising:
   a first step for obtaining, for the thermal imaging camera, a curve of temperature difference versus output code difference, where an X axis represents output code difference and a Y axis represents temperature difference indicated by a plurality of measured values;

a second step for obtaining, a function of temperature difference versus output code difference, the function curve-fitted by using the curve of temperature difference versus output code difference; and a third step for measuring a temperature of an object by applying the curve-fitted function of temperature difference versus output code difference.

9. A non-transitory computer-readable recording medium, recording a program for executing the method of claim 8 on a computer.

* * * * *

UNITED STATES PATENT AND TRADEMARK OFFICE
CERTIFICATE OF CORRECTION

| | |
|---|---|
| PATENT NO. | : 11,477,399 B2 |
| APPLICATION NO. | : 16/972904 |
| DATED | : October 18, 2022 |
| INVENTOR(S) | : Joon Sub Lee et al. |

It is certified that error appears in the above-identified patent and that said Letters Patent is hereby corrected as shown below:

In the Claims

Column 9, Line 53, Claim 2, delete "system" and insert -- camera --

Column 10, Line 5, Claim 3, delete "system" and insert -- camera --

Column 10, Line 35, Claim 5, delete "$\Delta CD\text{—}=a+b\times \Delta Tg+c\times \Delta Tg^2$" and insert -- $\Delta CD = a + b \times \Delta Tg + c \times \Delta Tg^2$ --

Signed and Sealed this
Twenty-first Day of March, 2023

*Katherine Kelly Vidal*
Katherine Kelly Vidal
*Director of the United States Patent and Trademark Office*